Patented Mar. 1, 1932

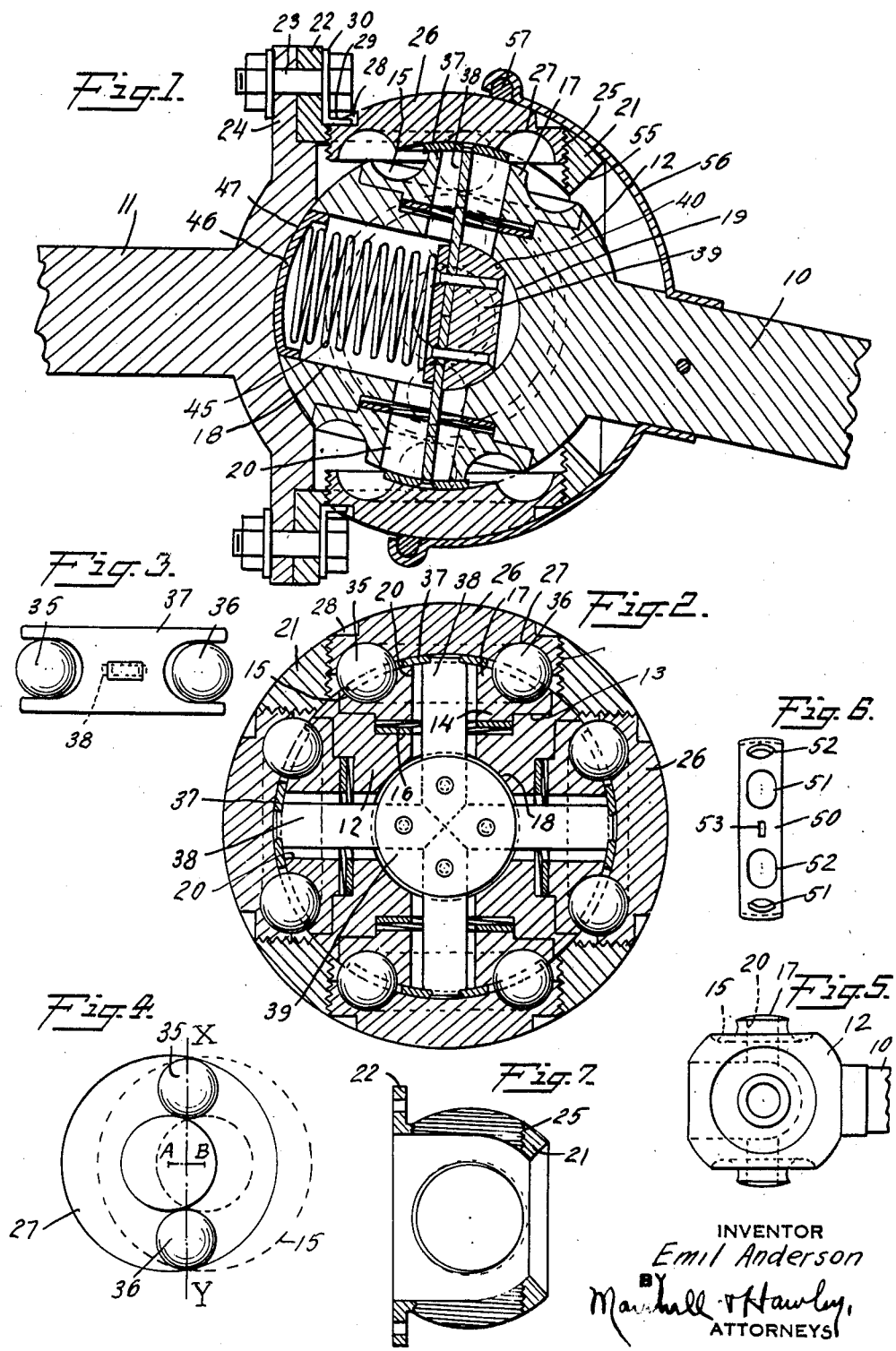

1,847,550

UNITED STATES PATENT OFFICE

EMIL ANDERSON, OF BRIARCLIFF MANOR, NEW YORK

UNIVERSAL JOINT

Application filed August 1, 1930. Serial No. 472,289.

This invention relates to universal joints for transmitting rotary motion from one shaft or a driving member to another shaft or driven member disposed at a variable angle thereto.

Universal joints of the type in common use do not transmit motion from the driving to the driven member at constant angular velocity but the rate of rotation or velocity of the driven member varies at different points in the rotation thereof with respect to the velocity of the driving member.

This invention has for its salient object to provide a universal joint that will transmit rotary motion from a driving member to a driven member at a constant angular velocity or, in other words, will transmit the motion in such a way that the rates of rotation of the two members will always be equal.

Another object of the invention is to provide a universal joint of the character described that is simple and practical in construction and can be readily assembled and taken apart.

Another object of the invention is to provide a joint of the character described, so constructed and arranged that lubricant can be effectively sealed therein.

Further objects of the invention will appear from the following specification taken in connection with the drawings which form a part of this application, and in which Fig. 1 is a sectional elevation of a universal joint conctructed in accordance with the invention;

Fig. 2 is a transverse sectional elevation taken at right angles to Fig. 1 and substantially through the balls which transmit the motion from one member to the other;

Fig. 3 is a plan view showing the cage or ball retainer used in the joint;

Fig. 4 is a diagrammatic view illustrating the positions of the balls with respect to the opposed ball races when the shafts or driving and driven members are disposed at an angle with respect to each other;

Fig. 5 is an elevational view showing the inner member of the joint;

Fig. 6 is a plan view showing a slightly different type of ball cage or retainer; and Fig. 7 is an elevational view showing the outer ball retaining member which carries the outer ball races.

The invention briefly described consists of a universal joint comprising a pair of relatively movable members, each member having formed thereon or carried thereby, a plurality of ball races. The ball races of one member are disposed opposite to and in cooperative relation with respect to the ball races of the other member, and a pair of balls are disposed between and in engagement with each set of oppositely disposed ball races.

Means is also provided for so locating the balls in the oppositely disposed cooperating races that the balls in the sets of races will always be retained in alinement or with their centers in a single plane. As the two shafts or driving and driven members are angularly moved relative to each other, the balls will be so disposed that a plane passing through their centers will bisect the angle between the two shafts or relatively movable members. Furthermore, the centers of the balls are always disposed equidistant from the center of rotation of the joint.

Further details of the invention will appear from the following description.

In the particular embodiment of the invention illustrated in the drawings, there is shown a pair of shafts 10 and 11, either of which may constitute the driving or driven shaft.

The shaft 10 has formed on the end thereof a member 12 which is generally or in the main spherical in shape and constitutes what may be termed the inner joint member.

The member 12 has formed in the outer surface thereof, a plurality of recesses 13 which extend inwardly from the outer surface thereof and are radially disposed with reference to the center of the member 12. Each recess has slidably fitted therein a plug 14, on the outer surface of which is formed a circular ball race 15. A spring washer 16 is disposed at the inner end of each recess 13 and is adapted to form a resilient seat for the plug 14. The circular grooves forming the ball races 15 are spherical in cross section and a plane passing through the centers of the spheres forming the grooves, when the grooves are exactly opposite each other, is, in each instance, disposed perpendicular to a radius from the geometrical center of the member 12 to the center of the registering circular grooves. Each ball race 15 has a centrally disposed outwardly projecting extension 17.

The member 12 has a recess 18 formed therein having a spherical inner end 19. Radially disposed recesses 20 extend outwardly through the member 12 and through the projections 17 of the ball races.

The outer member of the joint is connected to the shaft 11 and comprises a spherical housing 21 having a flange 22 which is bolted, as shown at 23, to a flange 24 formed on and extending laterally from the shaft 11.

The housing 21 has formed therein four radially disposed threaded openings 25 into which are threaded plugs 26 having circular ball races 27 formed therein. Each ball race 27 is adapted to coact with one of the inner ball races 15 in a manner hereinafter described.

In order to secure the plugs 26 against rotation, each plug has formed therein a plurality of notches 28 adapted to receive a projection 29 formed on a washer 30 secured by the bolt 23.

Two balls 35 and 36 are mounted between each set of opposed ball races and means is provided for maintaining the balls of the four sets of opposed races in alinement as the shafts 10 and 11 are angularly adjusted relative to each other. In the form of the invention shown in Fig. 1, this is accomplished by means of a plurality of clips 37 which are carried by radially extending resilient arms 38 which in turn are secured at their inner ends to a block 39. The block 39 has a spherical surface 40 which seats against the spherical surface 19 above referred to. The arms 38 extend outwardly through the openings 20 which are formed in the member 12 and in the plugs 14.

A spring 45 engages the block 39 at one end and at its other end seats in a cup 46 disposed in the recess 18 and having a spherical outer surface which engages the spherical surface 47 formed on the flanged extension of the shaft 11. When the shafts and joint members are angled, as shown in Fig. 1, the spring 45 is distorted and exerts pressure tending to center the block 39, arms 38 and ball retainers, and brings these parts back to their initial or central position when the shafts are moved into axial alinement.

If desired, the balls may be maintained in alinement by means of a ring 50, such as is shown in Fig. 6. This ring has a plurality of sets of openings 51 and 52 adapted to receive the balls 35 and 36 and has an opening 53 intermediate each pair of openings 51 and 52 adapted to receive the outer end of one of the arms 38 which is riveted thereto. The housing 21 is preferably beveled, as shown at 55.

The housing is preferably filled with lubricant and in order to retain the lubricant therein, a casing 56 is secured around the shaft 10 and extends around the outer surface of the spherical housing 21. A packing ring 57 is interposed between the outer edge of the casing 56 and the outer surface of the housing 21.

The action of the two ball races on the balls when the shafts are angled is illustrated diagrammatically in Fig. 4. The two races are here shown as offset relative to each other and it will be noted that the line X—Y which passes through the centers of the balls bisects the line A—B which connects the centers of the two ball races. Furthermore, from the showing in Fig. 1, it will be seen that a line or plane passing through the centers of the four sets of balls bisects the angle formed between the shafts 10 and 11. As the shafts are angled, the plane passing through the centers of the balls will pass through one half the angle of movement of the shafts. This is essential for the transmission of motion from the driving to the driven shaft at constant angular velocity.

The joint may be readily assembled in the following manner: The plugs 14 carrying the ball races 15 are first placed in the recesses 13 formed in the inner joint member 12. The block 39 is inserted in the recess 18 and the arms 38 having the clips 37 thereon are riveted to the block. Spring 45 and cup 46 are then placed in the recess 18. The inner joint member 12 is then placed within the outer joint housing 21 but the plugs 26 are not yet threaded into the openings 25 in the housing. Two balls 35 and 36 are then inserted through the openings 25, being disposed in the clips 37, and the plugs 26 are then screwed in, being held in the proper positions of adjustment by the extensions 29 of the washers 30. The housing is filled with lubricant, lubricant being placed in the recess 18 and in the space between the inner joint member 12 and the housing 21. The casing 56 is then secured in position, thus sealing the lubricant in the joint.

The operation of the joint will be clear from the foregoing description and, as stated, the centers of the balls of the four sets of coacting ball races will always be maintained in a plane which bisects the angle between the two shafts, thus insuring the transmission of motion at constant angular velocity from the driving to the driven member or, in other words, insuring the same velocity or rate of rotation for the driven member as that of the driving member.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A universal joint comprising a pair of shafts, a joint member connected to each shaft and having a plurality of circular ball races, the races carried by one member being arranged to coact with corresponding races of the other member, and a pair of balls positioned between and disposed in engagement with the coacting races of each set of races.

2. A universal joint comprising a pair of shafts, a joint member connected to each shaft and having a plurality of circular ball races, the races carried by one member being arranged to coact with corresponding races of the other member, a pair of balls positioned between and disposed in engagement with the coacting races of each set of races, and means for retaining the balls in alinement.

3. A universal joint comprising a pair of shafts, a joint member connected to each shaft and having a plurality of circular ball races, the races carried by one member being arranged to coact with corresponding races of the other member, a pair of balls positioned between and disposed in engagement with the coacting races of each set of races, and means for resiliently retaining the balls in alinement.

4. A universal joint comprising a pair of shafts, a joint member connected to each shaft and having a plurality of circular ball races, the races carried by one member being arranged to coact with corresponding races of the other member, a pair of balls positioned between and disposed in engagement with the coacting races of each set of races, and means for retaining the balls in alinement, the balls being so alined that a plane passing through their centers bisects the angle between the shafts.

5. A universal joint comprising a pair of shafts, a joint member connected to each shaft and having a plurality of circular ball races, the races carried by one member being arranged to coact with corresponding races of the other member, a pair of balls positioned between and disposed in engagement with the coacting races of each set of races, and means for retaining the balls in alinement, the balls of each set being so held by said retaining means that a line connecting their centers will be bisected by a radius perpendicular thereto from the center of the joint.

6. A universal joint comprising a pair of shafts, a joint member connected to each shaft and having a plurality of circular ball races, the races carried by one member being arranged to coact with corresponding races of the other member, a pair of balls positioned between and disposed in engagement with the coacting races of each set of races, and means for retaining the balls in alinement, the balls of each set being so held by said retaining means that a line connecting their centers will be bisected by a line perpendicular thereto from the point of intersection of the axes of the shafts.

7. A universal joint comprising a pair of shafts, a joint member connected to each shaft, a plurality of curved oppositely facing ball races, a pair of balls between each set of opposed races, and retaining means for maintaining the balls in alinement.

8. A universal joint comprising a pair of shafts, a joint member connected to each shaft, a plurality of curved oppositely facing ball races, a pair of balls between each set of opposed races, and retaining means for maintaining the balls in alinement with their centers in a plane bisecting the angle between the shafts.

9. A universal joint comprising a pair of shafts, a joint member connected to each shaft, a plurality of curved oppositely facing ball races, a pair of balls between each set of opposite races, and retaining means for maintaining the balls in alinement, the centers of the balls being always equidistant from the point of intersection of the shaft axes.

10. A universal joint comprising a pair of shafts, a joint member connected to each shaft, a plurality of curved oppositely facing ball races, a pair of balls between each set of opposite races, and retaining means for maintaining the balls in alinement, the centers of the balls being always equidistant and a constant distance from the point of intersection of the shaft axes.

11. A universal joint comprising a pair of shafts, a joint member connected to each shaft, a plurality of curved oppositely facing ball races, a pair of balls between each set of opposed races, and retaining means for maintaining the balls in alinement, the balls of each set being so held by said retaining means that a line connecting their centers will be bisected by a radius perpendicular thereto from the center of the joint.

12. A universal joint comprising a pair of shafts, a joint member connected to each shaft, a plurality of curved oppositely facing ball races, a pair of balls between each set of opposed races, and resiliently acting retaining means for maintaining the balls in alinement.

13. A universal joint comprising a pair of shafts, a joint member connected to each shaft, a plurality of curved oppositely facing ball races, a pair of balls between each set of opposed races, and retaining means for maintaining the balls in alinement, said retaining means being carried by arms radiating from the point of intersection of the shaft axes.

14. A universal joint comprising a pair of shafts, a joint member connected to each shaft, a plurality of curved oppositely facing ball races, balls between the opposed races of said sets of races, and retaining means for maintaining the balls in alinement, said retaining means being carried by arms radiating from the point of intersection of the shaft axes.

15. A universal joint comprising an inner joint member having a substantially spherical outer surface, an outer member having a substantially spherical inner surface, a plurality of inwardly facing circular ball races carried by the outer joint member, a corresponding number of outwardly facing ball races on the inner joint member adapted to coact with the outer races, and a pair of balls disposed between and engaging the coacting inner and outer races.

16. A universal joint comprising an inner joint member having a substantially spherical outer surface, an outer member having a substantially spherical inner surface, a plurality of inwardly facing circular ball races carried by the outer joint member, a corresponding number of outwardly facing ball races on the inner joint member adapted to coact with the outer races, a pair of balls disposed between and engaging the coacting inner and outer races, and a ball retainer for maintaining the balls in alinement.

17. A universal joint comprising an inner joint member having a substantially spherical outer surface, an outer member having a substantially spherical inner surface, a plurality of removable, inwardly facing circular ball races carried by the outer member, a corresponding number of outwardly facing ball races on the inner joint member adapted to coact with the outer races, and a pair of balls disposed between and engaging the coacting inner and outer races.

18. A universal joint comprising a pair of shafts, a joint member connected to each shaft, a plurality of curved oppositely facing ball races, a pair of balls between each set of opposed races, retaining means for maintaining the balls in alinement, and means surrounding said joint for sealing lubricant therein.

19. A universal joint comprising an inner joint member having a substantially spherical outer surface, an outer member having a substantially spherical inner surface, a plurality of removable, inwardly facing circular ball races carried by the outer member, a corresponding number of outwardly facing ball races on the inner joint member adapted to coact with the outer races, a pair of balls disposed between and engaging the coacting inner and outer races, and means surrounding said outer joint member for sealing lubricant in the joint.

20. A universal joint comprising a pair of shafts, a joint member connected to each shaft and having a plurality of circular ball races, the races carried by one member being arranged to coact with corresponding races of the other member, one of said races of each set of coacting races being yieldable, and a pair of balls positioned between and disposed in engagement with the coacting races of each set of races.

21. A universal joint comprising a pair of shafts, a joint member connected to each shaft and having a plurality of circular ball races, the races carried by one member being arranged to coact with corresponding races of the other member, one of said races of each set of coacting races being yieldable, and a pair of balls positioned between and disposed in engagement with the coacting races of each set of races relative to the other race of said set.

22. A universal joint comprising a pair of shafts, a joint member connected to each shaft, a plurality of curved oppositely facing ball races, a pair of balls between each set of opposed races, retaining means for maintaining the balls in alinement, and means for centering said retaining means relative to said opposed races.

23. A universal joint comprising a pair of shafts, a joint member connected to each shaft, a plurality of curved oppositely facing ball races, a pair of balls between each set of opposed races, retaining means for maintaining the balls in alinement, and resiliently acting means for centering said retaining means relative to said opposed races.

EMIL ANDERSON.